United States Patent
Seki (10) Patent No.: US 7,336,319 B2
(45) Date of Patent: Feb. 26, 2008

(54) DIGITAL CAMERA APPARATUS HAVING A RECOGNIZING FUNCTION

(75) Inventor: Kazuyuki Seki, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 725 days.

(21) Appl. No.: 10/733,394

(22) Filed: Dec. 12, 2003

(65) Prior Publication Data

US 2004/0252219 A1 Dec. 16, 2004

(30) Foreign Application Priority Data

Dec. 19, 2002 (JP) ............................ 2002-368924

(51) Int. Cl.
*H04N 7/00* (2006.01)
*G06K 7/10* (2006.01)

(52) U.S. Cl. .................. 348/552; 235/462.41
(58) Field of Classification Search ........... 235/462.41; 348/552
See application file for complete search history.

(56) References Cited

U.S. PATENT DOCUMENTS

| | | | |
|---|---|---|---|
| 5,784,102 A * | 7/1998 | Hussey et al. ............... 348/296 |
| 6,122,409 A * | 9/2000 | Boggs et al. ................ 382/276 |
| 6,330,975 B1 * | 12/2001 | Bunte et al. ............ 235/472.01 |
| 6,561,428 B2 * | 5/2003 | Meier et al. ........... 235/462.25 |
| 6,565,004 B2 | 5/2003 | Ishii et al. |
| 6,604,682 B2 | 8/2003 | Wakamiya et al. |
| 6,637,662 B2 * | 10/2003 | Itou et al. ............... 235/472.01 |
| 6,744,938 B1 * | 6/2004 | Rantze et al. ................ 382/312 |

2002/0171745 A1 * 11/2002 Ehrhart ..................... 348/231.3

FOREIGN PATENT DOCUMENTS

| JP | 5-114041 | 5/1993 |
|---|---|---|
| JP | 8-138144 | 5/1996 |
| JP | 09-114913 | 5/1997 |
| JP | 09-185695 | 7/1997 |
| JP | 2002-42053 | 2/2002 |
| JP | 2002-157549 | 5/2002 |
| JP | 2002-354305 | 12/2002 |

OTHER PUBLICATIONS

U.S. Appl. No. 09/821,248, filed Mar. 30, 2001, Seki et al.
U.S. Appl. No. 10/330,349, filed Dec. 30, 2002, Seki et al.
U.S. Appl. No. 10/733,394, filed Dec. 12, 2003, Seki.

* cited by examiner

*Primary Examiner*—David Ometz
*Assistant Examiner*—Wanda M. Negrón
(74) *Attorney, Agent, or Firm*—Oblon, Spivak, McClelland, Maier & Neustadt, P.C.

(57) ABSTRACT

A digital camera apparatus of the present invention comprises an image inputting device for inputting an image to be photographed; an image processing device for carrying out a processing of the image inputted by the image inputting device; a recognizing device which automatically recognizes a printed code included in the image; a displaying device for displaying a result of the recognition of the recognizing device; and a recording device for recording data of the recognition automatically recognized by the recognizing device. The recognizing device automatically recognizes the printed code of the image scanned by triggering a first release by the image inputting device before determining and recording the image in a second release by the image inputting device.

24 Claims, 12 Drawing Sheets

| | | |
|---|---|---|
| LEFT GUARD BAR | | 3 MODULES |
| LEFT CHARACTER | 1 | 7 |
| | 2 | 7 |
| | 3 | 7 |
| | 4 | 7 |
| | 5 | 7 |
| | 6 | 7 |
| CENTER BAR | | 5 |
| RIGHT CHARACTER | 1 | 7 |
| | 2 | 7 |
| | 3 | 7 |
| | 4 | 7 |
| | 5 | 7 |
| CHECK CHARACTER | | 7 |
| RIGHT GUARD BAR | | 3 |
| TOTAL | | 88 |

```
//CODE CAMERA MEMO CORRESPONDING LIST
//START
4902102020466, TEA500
4985816203028, COPY PAPER
4965957302798, INK CARTRIDGE
4545792000082, BLUETOOTH CARD
4981254660140, WIRELESS LAN CARD
   .
   .
   .
//END
```

User Comment Tag
G C M-T A G (NULL)
Cameramemo-Text1 (NULL)   Cameramemo-Text2 (NULL)
Cameramemo-Text3 (NULL)   Cameramemo-Text4 (NULL)
Cameramemo-Text5 (NULL)     (NULL)

FIG. 11B

Cameramemo-Text1 (NULL)   →   TEA500
Cameramemo-Text2 (NULL)   →   4902102020466

DIGITAL CAMERA APPARATUS HAVING A RECOGNIZING FUNCTION

BACKGROUND OF THE INVENTION

1. Field of the Invention

The present invention relates to a digital camera apparatus, for example, a PDA (Personal Digital Assistant) with a digital camera, a palmtop PC (Personal Computer) with a digital camera function, a laptop PC with a digital camera function and a telephone with a digital camera function and the like.

2. Description of the Prior Art

In a digital camera, because of a fact that it can be used conveniently, many images are photographed frequently. However, it is also a fact that processes for arranging and classifying the photographed images after photographing become cumbersome. As a solution to this cumbersomeness, there has been developed a digital camera which associates a TEXT or a voice with the image and carries out automatic process by a personal computer or a server. In such digital camera, a method of downloading a list previously created on the personal computer to the digital camera and associating the image by means of selecting a name of item of the created list at the time of photographing, or a method of downloading a content created by a software keyboard using touch panels to a Exif (Exchangeable image file format) file at the time of photographing, have been performed.

In addition, although there is cumbersomeness of inputting by the software keyboard, such a method in which standard phrases are stored to an external memory or to an internal memory beforehand, and can be easily selected by operation of touch panels or keystrokes, has also been performed.

Furthermore, for business use, there has been a demand for recognizing a printed code such as a bar code used for product identification and adding information to the photographed image by associating the photographed image with the printed code.

As a typical example for the prior art, there is an image recognition system which displays a display frame used for a guide on the personal computer and the like by providing a camera as an inputting device, and processes the recognition on the personal computer and the like after scanning the image (for example, see Japanese Patent Laid Open No. H9-185695). Also, there is a reading device which photographs the image and then performs the process of recognition (for example, see Japanese Patent Laid Open No. H9-114913).

However, in conventional digital cameras including the above mentioned prior arts, there has not been existed such a digital camera which recognizes a code which corresponds to an object during a series of photographing operation, and determines the recognition similar to determination of the photographing operation after displaying a result of the recognition. Accordingly, such a digital camera which is capable of photographing the object after unfailingly recognizing the code which corresponds to the object, and unmistakably carrying out the association between the printed code and the image of photograph, is called for.

SUMMARY OF THE INVENTION

Therefore, an object of the present invention is to provide a digital camera apparatus capable of easily scanning an identification code by directly associating the identification code with an Exif file of an image of photograph or associating the identification code with the Exif file of the image of photograph after converting the identification code to corresponding information, by means of a main body of the digital camera having a function for recognizing the printed code such as a bar code.

To accomplish the above mentioned object, a digital camera apparatus relating to a first aspect of the present invention comprises an image inputting device for inputting an image to be photographed; an image processing device for carrying out a processing of the image inputted by the image inputting device; a recognizing device which automatically recognizes a printed code included in the image; a displaying device for displaying a result of the recognition of the recognizing device; and a recording device for recording data of the recognition automatically recognized by the recognizing device. In addition, the recognizing device automatically recognizes the printed code of the image scanned by triggering a first release by the image inputting device before determining and recording the image in a second release by the image inputting device.

A digital camera apparatus relating to a second aspect of the present invention comprises a guide displaying device which displays a most appropriate guide for recognizing a printed code; an image inputting device for inputting an image to be photographed; an image processing device which carries out a processing of the image inputted by the image inputting device; a recognizing device which automatically recognizes the printed code included in the image; a displaying device for displaying a result of the recognition of the recognizing device; and a recording device for recording data of the recognition automatically recognized by the recognizing device. In addition, the printed code is automatically recognized by adapting the printed code to the most appropriate guide displayed by the guide displaying device.

A digital camera apparatus relating to a third aspect of the present invention comprises an image inputting device for inputting an image to be photographed; an image processing device which carries out a processing of the image inputted by the image inputting device; a recognizing device which automatically recognizes a printed code included in the image; a displaying device for displaying a result of the recognition of the recognizing device; a recording device for recording data of the recognition automatically recognized by the recognizing device; a code setting device for setting a kind of the printed code to be automatically recognized; a guide displaying device which displays a most appropriate guide for recognizing the printed code in accordance with a content set by the code setting device; and a resolution setting device for setting a resolution of the image which is scanned. In addition, the printed code is automatically recognized pursuant to the displaying of the guide corresponding to the content set by the code setting device and to the resolution of the image set by the resolution setting device.

A digital camera apparatus relating to a fourth aspect of the present invention comprises an image inputting device for inputting an image to be photographed; an image processing device which carries out a processing of the image inputted by the image inputting device; a recognizing device which automatically recognizes a printed code included in the image; a displaying device for displaying a result of the recognition of the recognizing device; a recording device for recording data of the recognition automatically recognized by the recognizing device; a code setting device for setting a kind of the printed code to be automatically recognized; and a guide displaying device which displays a most appropriate guide for recognizing the printed code in accordance with a content set by the code setting device. In addition, a switching over of photographing modes is automatically carried out corresponding to the most appropriate guide displayed by the guide displaying device.

In one embodiment, the above mentioned code setting device sets start/stop codes and a kind of bars as the content of the setting thereof.

Also, the above mentioned guide displaying device shows a minimum size necessary for carrying out the recognition to an user as a guide display.

Furthermore, a transverse width of the minimum size of the guide display is decided from a minimum line width of a bar code.

A digital camera apparatus relating to a fifth aspect of the present invention comprises an image inputting device for inputting an image to be photographed; an image processing device which carries out a processing of the image inputted by the image inputting device; a recognizing device which automatically recognizes a printed code included in the image; a displaying device for displaying a result of the recognition of the recognizing device; a recording device for recording data of the recognition automatically recognized by the recognizing device; and an information searching device which defines an information file where information corresponding to the printed code is included therein to an external memory and an internal memory beforehand, and searches the corresponding information after the printed code is recognized. In addition, an adding of information is carried out by converting the printed code to information corresponding to the printed code.

Also, a result of the recognition of the above mentioned printed code makes it possible to be notified by a playback of voice.

Furthermore, a bar code for identification in commercial use is included in the above mentioned printed code.

DETAILED DESCRIPTION OF THE PREFERRED EMBODIMENTS

Hereinafter, some of embodiments of a digital camera apparatus relating to the present invention will be described in detail with reference to the accompanying drawings.

Figure 1:
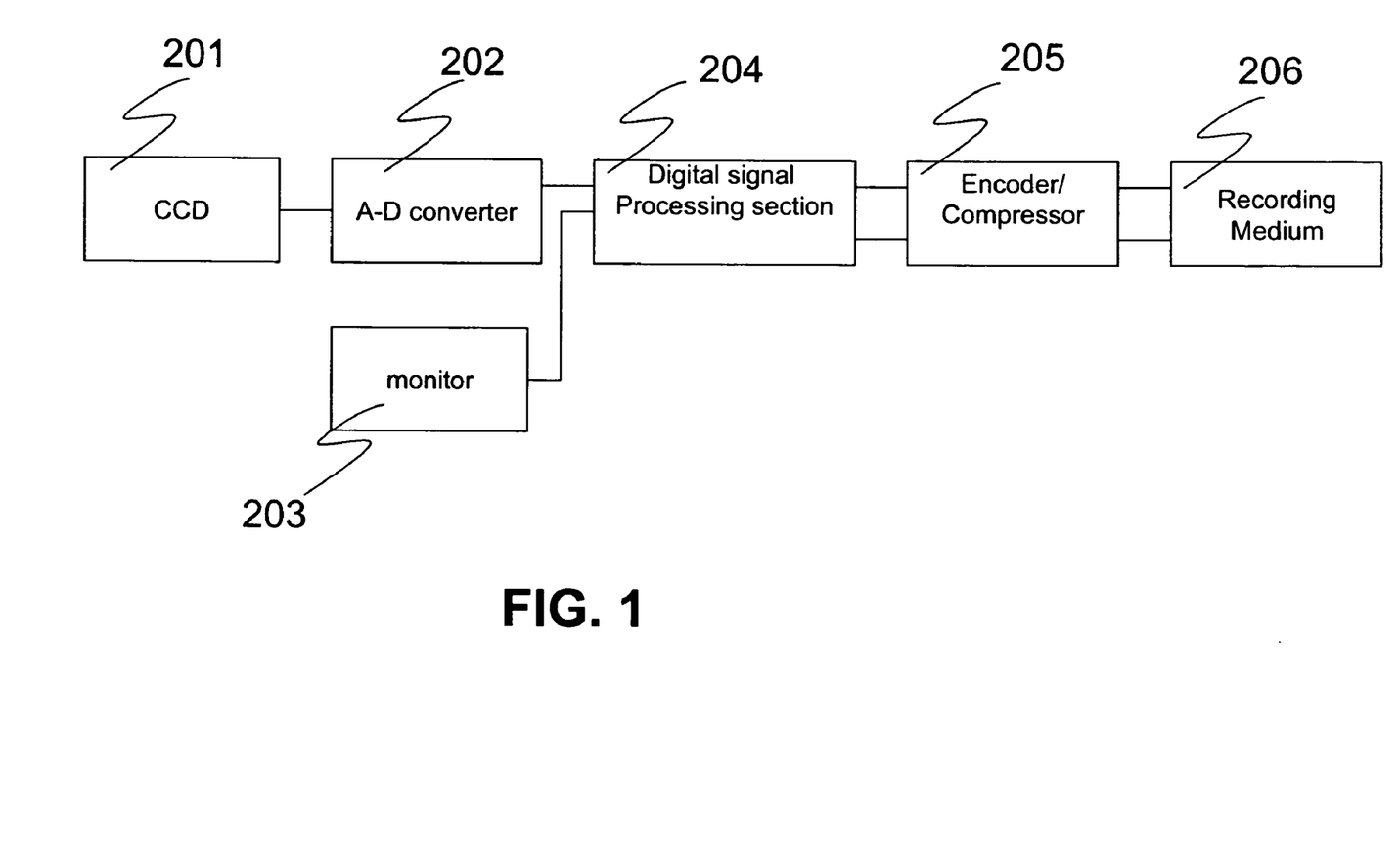
FIG. 1 is a block diagram showing a basic structure of a digital camera apparatus relating to the present invention.

In FIG. 1, there is shown an example of a typical basic structure of the digital camera apparatus.

An inputted image is converted into an electrical signal by an imaging device CCD (201), and the electrical signal is inputted to a digital signal processing section (204) after converted into a digital signal by an A-D converter having 8 bits (256 gradation sequence)-12 bits (4096 gradation sequence) (202).

Main processes carried out in the digital signal processing section are (1). a photometry calculation necessary for auto focusing (AF), automatic exposure control (AE) and auto white balance (AWB), (2). a signal processing of brightness and color for enhancing resolution and color reproducibility, and (3). data compression and decompression necessary for recording and playing of image data.

The data encoded and compressed (205) is to be written in a recording media 6 (206). The playing of the recorded data is outputted as a video signal for a V monitor after decompressed and converted into raster data (203).

Figure 2:
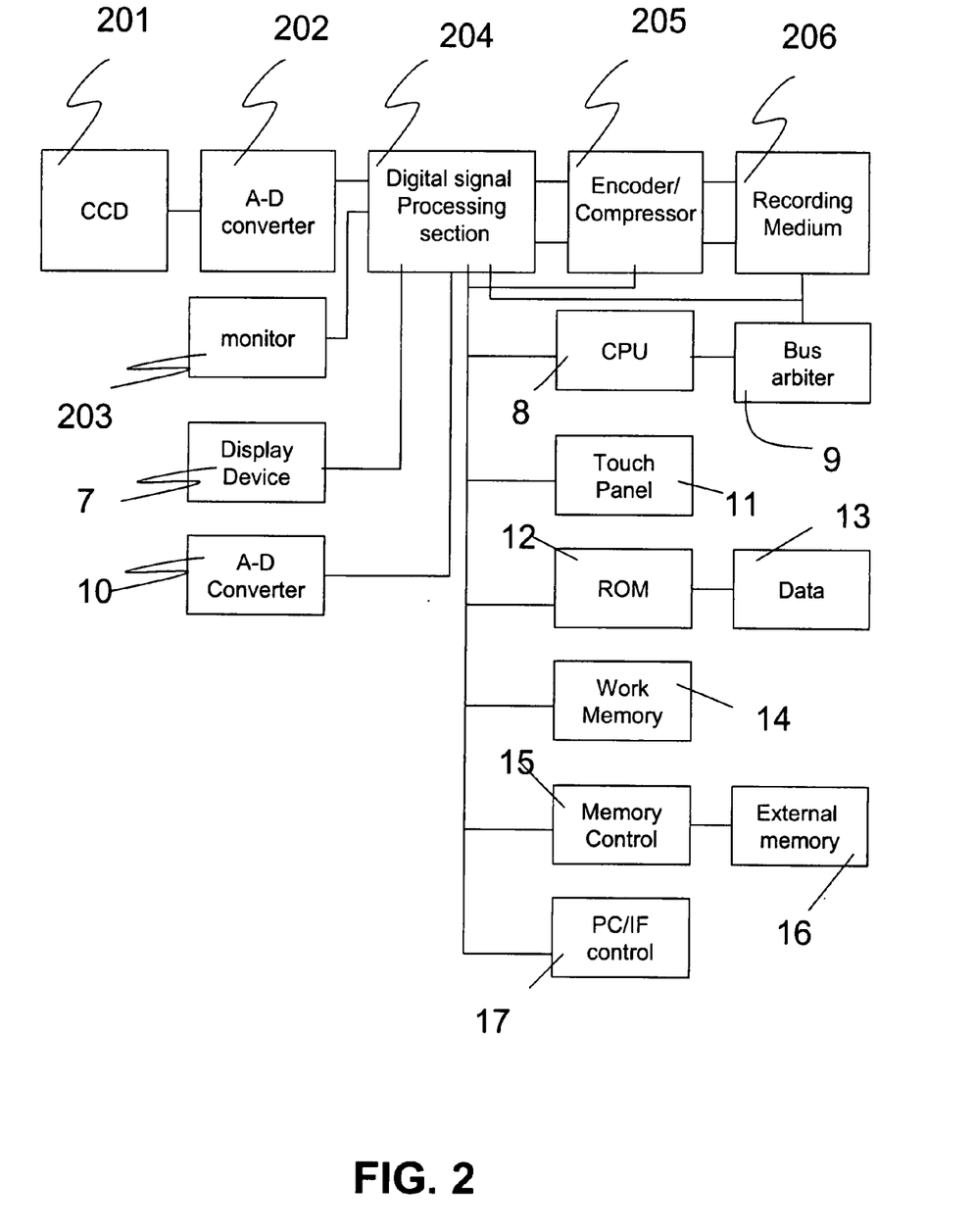
FIG. 2 is a block diagram showing a structure of an inner circuit of a digital camera which is an embodiment of the present invention.

Next, an example of a block diagram of an inner circuit of a digital camera in the digital camera apparatus of the present invention will be shown in FIG. 2.

In the example shown in FIG. 2, when the digital camera is in a code recognition mode, a most appropriate guide is calculated by a CPU 8 according to a content of setting of a F-ROM for data 13, and the calculated guide is outputted to a displaying device 7 such as a LCD and the like. Scanning of an image is carried out after triggering a first release (half pressing down) as well as the photographing process such as the AF and AE and the like are performed, and the image is uncompressed in a work memory 14, and is processed with a code recognition process by the CPU 8. A result of the code recognition process is outputted to the displaying device 7, and is determined when a second release (full pressing down) is carried out, and recorded in the F-ROM for data 13. A conversion process from the code to information is searched within a corresponding file between the code and the information previously stored in an external memory 16 or in an internal memory, and this search result is outputted to the LCD through a control section of the displaying device 7. Later, the search result is stored in the external memory 16 by adding the stored code or the information data to the Exif file created by the photographing.

Reference numeral 15 denotes a memory control. The code recognition process, data transmission process with the external memory 16, the searching of corresponding file, the conversion process and the information adding process to the Exif file are executed by program written in a ROM 12.

Meanwhile, reference numeral 9 denotes a bus arbiter, reference numeral 10 is an A-D conversion for a mike input, reference numeral 11 is a touch panel, and reference numeral 17 denotes a PC I/F control.

Figure 3:
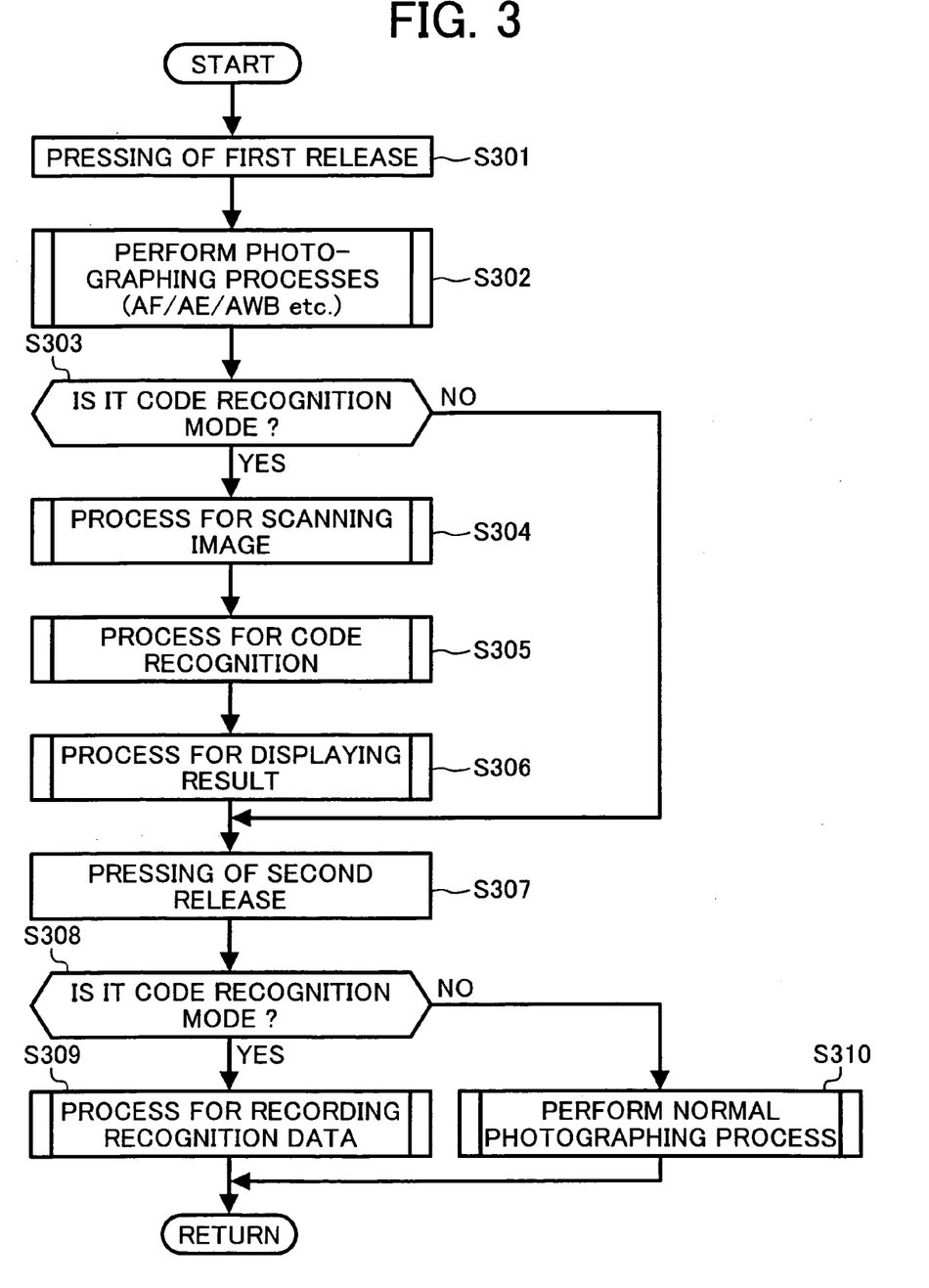
FIG. 3 is a flowchart showing a processing operation relating to a first embodiment of the present invention.

Next, a series of processing flow in a first embodiment of the present invention will be described with reference to FIG. 3.

First of all, in the digital camera of the present invention, the first release (half pressing down) is carried out (S301), and normal photographing processes such as the auto focus, the auto exposure control and the auto white balance are performed (S302). After the photographing processes are performed, a judgment in the code recognition mode is carried out (S303). At this time, when the code recognition mode is not set (S303/NO), the second release (full pressing down) is carried out (S307).

When the code recognition mode is set (S303/YES), a scanning process of the image is carried out with a predetermined resolution (S304). Then, the code recognition process is carried out with the image uncompressed in a workflow by the CPU 8 (S305). Additionally, the result of the code recognition is outputted to the displaying device such as the LCD (S306).

Subsequently, after the second release (full pressing down) is performed (S307), the judgment in the code recognition mode is carried out (S308). At this time, when the code recognition mode is not set (S308/NO), a normal photographing process is performed (S310). When the code recognition mode is set (S308/YES), data of the recognition is recorded to the F-ROM for data (S309).

As described above, according to the first embodiment of the present invention, it is possible to carry out the automatic recognition of a printed code such as a bar code by a simple operation similarly to a normal photographing operation.

Next, a second embodiment of the present invention will be described.

In the second embodiment, an image of screen of a guide display in the code recognition mode is described with reference to FIG. 4, and a decided example of the guide display is described with reference to FIG. 5.

Figure 4:
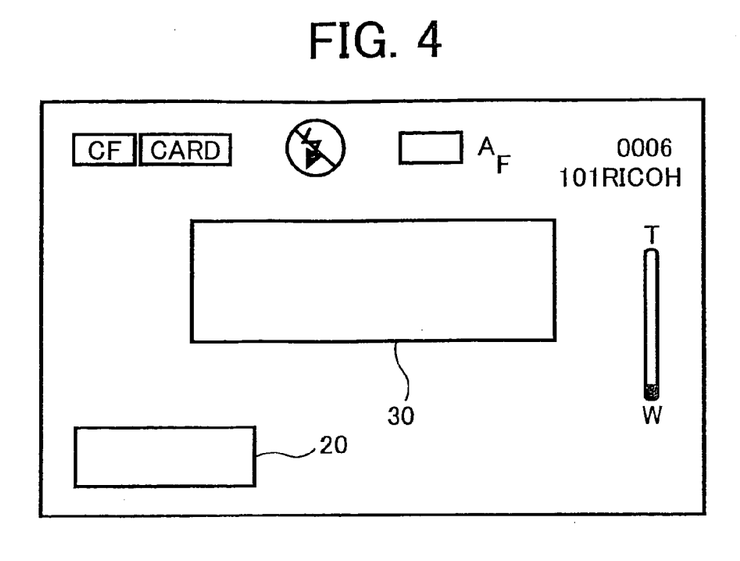
FIG. 4 is an image diagram showing one example of a screen representing a selection relating to the first embodiment of the present invention.
Figure 5:
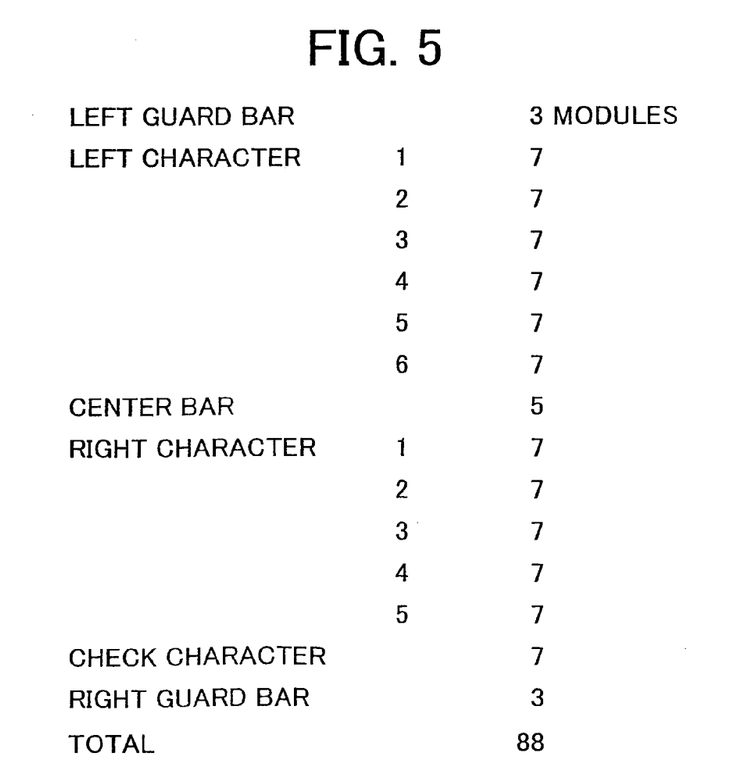
FIG. 5 is a diagram showing a decided example of a displaying of a guide relating to the first embodiment of the present invention.

In an example for the image of screen shown in FIG. 4, at first, a mode displaying 20 is displayed at lower-left side of the screen, and a minimum size which is a size necessary to be able to carry out the recognition is represented by a frame 30, and a comment for promoting photographer's attention is inserted in the frame 30. For example, a comment such as "Please enlarge it so that an object becomes larger than this frame size" may be inserted.

By enlarging the object over the size of the guide frame, the photographer can reduce an error in the recognition.

Now, an example for displaying the guide display displayed from utilizing a minimum line width of the bar code will be described with reference to FIG. 5.

In a case of JAN (Japanese Article Number) code, 1 module (unit for minimum width of bar) is specified as 0.33 millimeter as a basic. Also, it is structured as a total of 88 modules as shown in FIG. 5. If number of dots in an image allotted to recognition of the minimum line width is assumed as 3 dots, it will be 88×3=264 dots. If the image which is to be scanned is in VGA size (640×480), the minimum size can be represented if the guide is displayed on the LCD by that ratio. The number of dots can be decided by power of resolving the 0.33 millimeter. It is also possible to enhance the resolution of the image to be scanned if the resolving power is insufficient.

Figure 6:
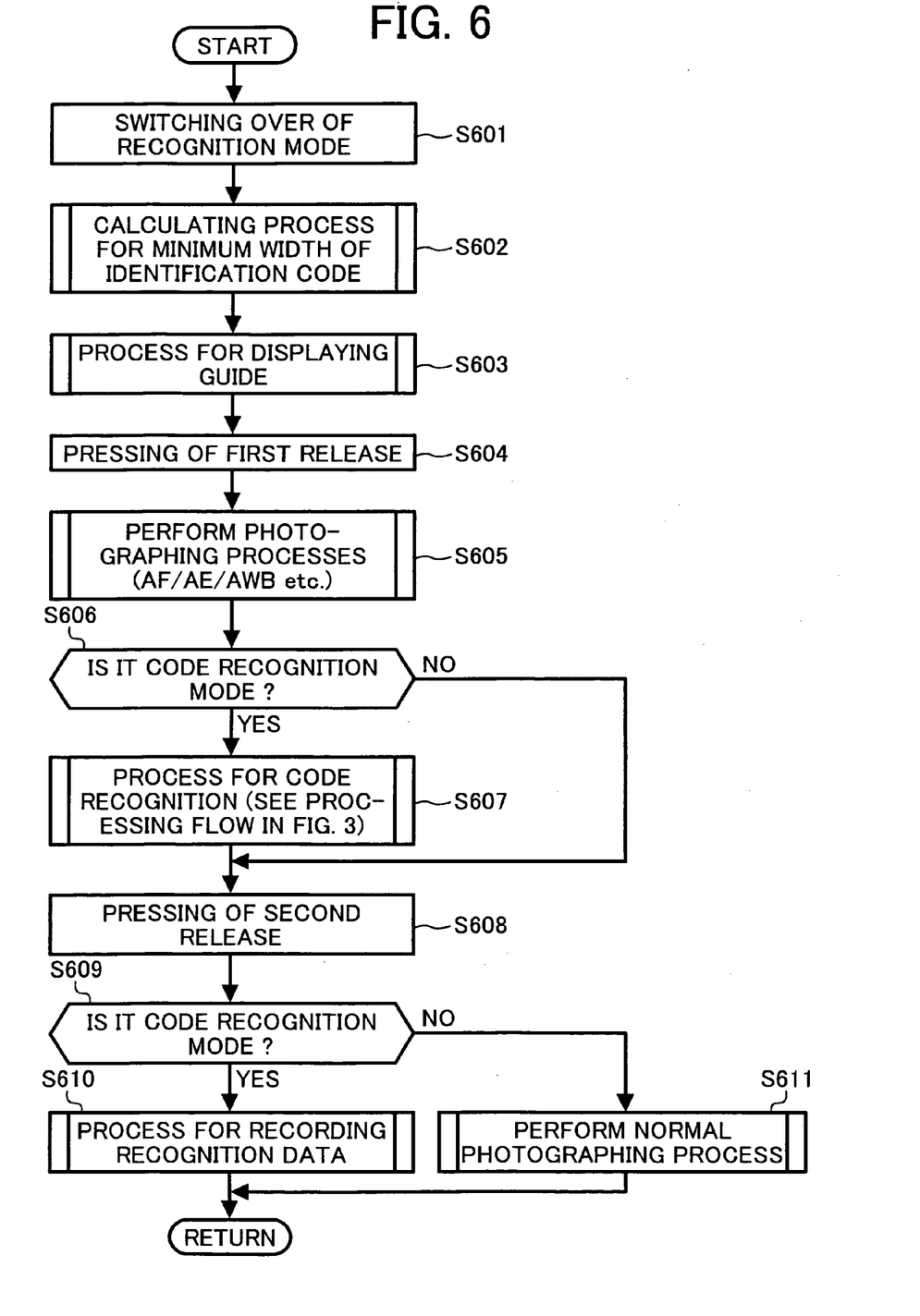
FIG. 6 is a flowchart showing a processing operation relating to a second embodiment of the present invention.

Next, an example for a series of processing flow in the code recognition mode will be described with referring to FIG. 6.

Firstly, a recognition mode is started by an operation operated by an user (S601). Subsequently, the minimum width of the code to be recognized is calculated (S602). An example of the calculation is as shown in FIG. 5. Then, the guide is displayed in accordance with a result of the calculation (S603).

After the first release (half pressing down) is performed (S604) and the photographing processes are performed (S605), the judgment in the code recognition mode is carried out (S606). At this time, if the code recognition mode is not set (S606/NO), the second release (full pressing down) is carried out (S608). If it is the code recognition mode (S606/YES), the judgment in the recognition mode, scanning of the image and the code recognition process are performed, and the result is displayed (S607).

In addition, after the second release (full pressing down) is performed (S608), the judgment in the code recognition mode is carried out (S609). At this time, if the code recognition mode is not set (S609/NO), the normal photographing process is performed (S611). If it is the code recognition mode (S610/YES), the data of the recognition is recorded to the F-ROM for data (S610).

As described above, according to the second embodiment, the error in the recognition can be reduced by carrying out the most appropriate guide display in the code recognition and following this guide display.

Next, a third embodiment of the present invention will be described.

As an instance, there are various kinds of printed codes even the bar code is examined. It ranges from the simple ones such as NW-7 developed in relatively early stage by Monarch Marking Ltd in 1972, Alphanumeric and CODE-39 in which seven kinds of symbols are coded which are developed by Intermec Corp. in 1975, to CODE-128 in which 128 characters in Full ASCII are symbolized developed by Computer Identics Corp. in 1981. A point of whether or not the automatic recognition can be carried out with the image among them depends on whether the recognition for a narrowest white bar and a narrowest black bar can be done or not.

In the third embodiment, by setting kinds of printed codes which are to be recognized in a set-up mode previously, the error in the recognition can be reduced, for example, by judging whether or not the narrowest white and black bars can be recognized from start/stop codes in the code which is to be recognized or from characteristic in kinds of bars and then previously setting the resolution of the image to be scanned corresponding to that judgment, or performing changing over operation based on a result in reading.

Figure 7A:
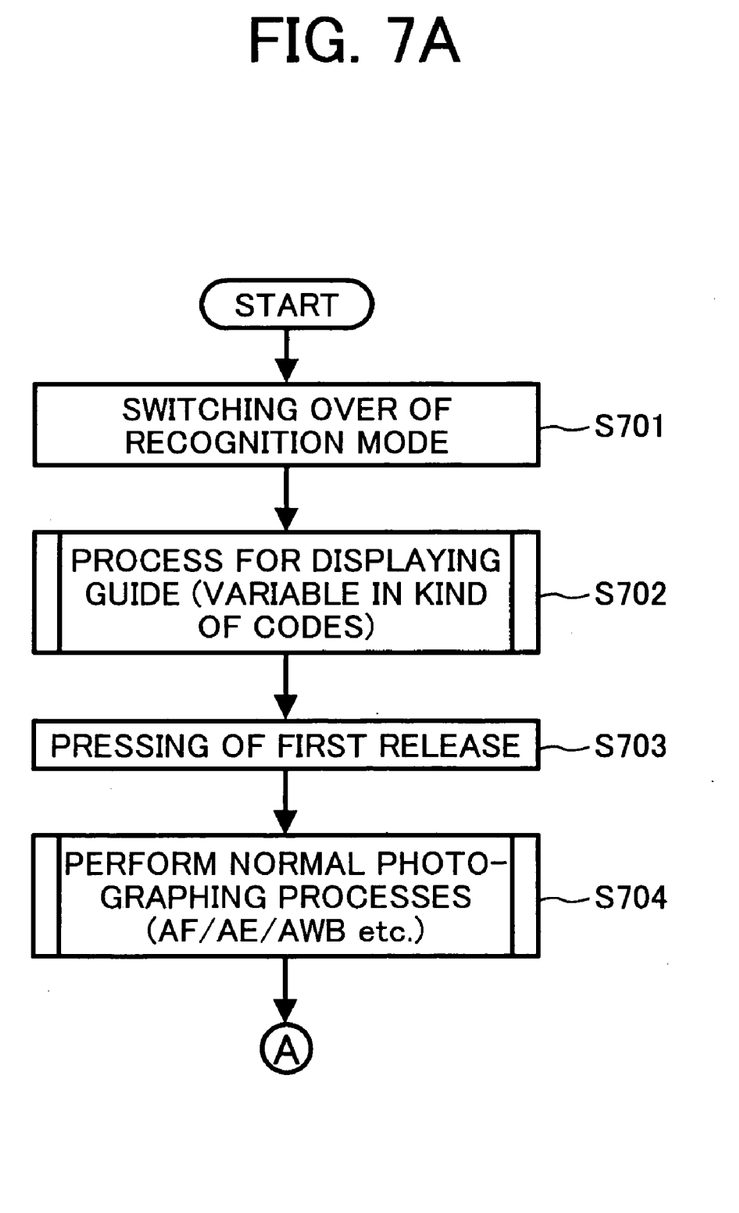
FIG. 7 is a flowchart showing a processing operation relating to a third embodiment of the present invention.
Figure 7B:
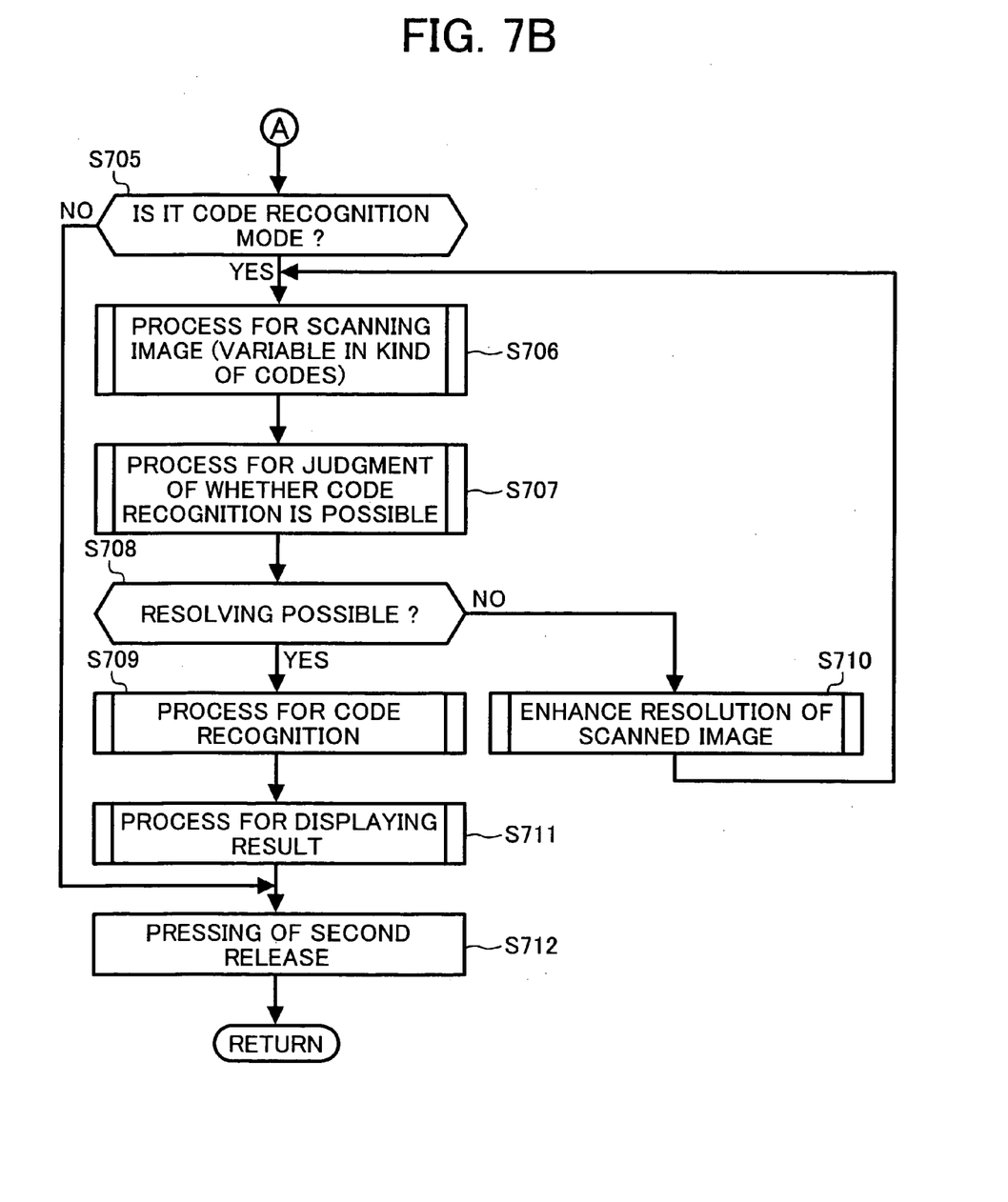

Next, an example for a series of processing flow in the third embodiment of the present invention will be described with referring to FIG. 7.

First of all, the recognition mode is started by the operation of the user (S701). Subsequently, the guide is displayed corresponding to the content of setting of the kinds of codes. In a case when the kinds of codes are cannot be decided from a reason such as variable length, the guide is displayed with a temporal size (S702).

Subsequently, the first release (half pressing down) is performed (S703), and the normal photographing processes such as the auto focus, the auto exposure control and the auto white balance are carried out (S704).

After the photographing processes are performed (S704), the judgment in the code recognition mode is carried out (S705). At this time, if the code recognition mode is not set (S705/NO), the second release (full pressing down) is performed (S712).

If it is the code recognition mode (S705/YES), the scanning of the image is carried out with the resolution decided by the setting of the content of the kinds of codes (S706). Then, find the narrowest white and black bars in accordance with the kinds of codes and judge whether the resolving is possible or not (S707). If the resolving is impossible to be carried out (S708/NO), the resolution of the scanned image is enhanced (S710) and returned to S706.

If the resolving is possible to be carried out (S708/YES), the code recognition process (S709) and the process of displaying the result (S711) are performed. Operations after the performing of the second release (full pressing down) (S712) are similar to the operations after S308 in FIG. 3.

As described above, according to the third embodiment of the present invention, by displaying the guide display which corresponds to the kinds of the codes and by setting the resolution of the image to be scanned and adapting the processes to that setting, the error in the recognition can be reduced.

Next, a fourth embodiment of the present invention will be described.

In this fourth embodiment, a setting of photographing is automatically changed over in accordance with the kinds of codes which have been set when the digital camera is entered to the code recognition mode. An example of a processing flow of the changing over process will be described with reference to FIG. 8.

Figure 8:
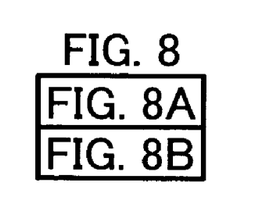
FIG. 8 is a flowchart showing a processing operation relating to a fourth embodiment of the present invention.
Figure 8A:
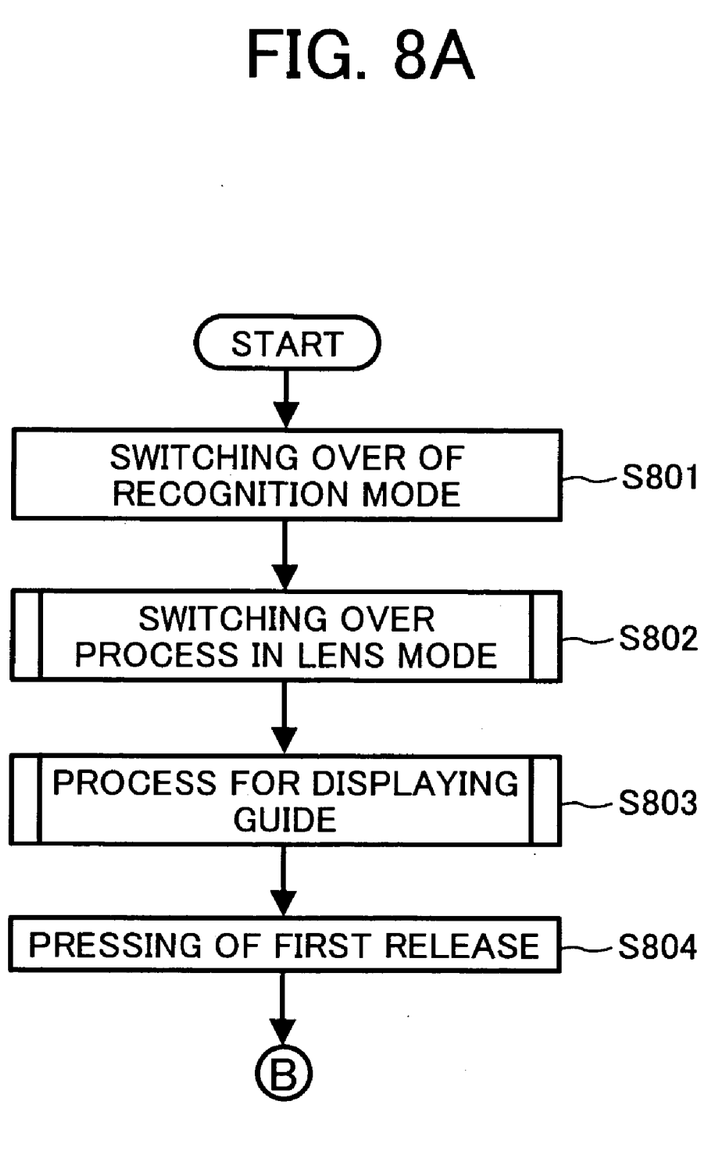
Figure 8B:
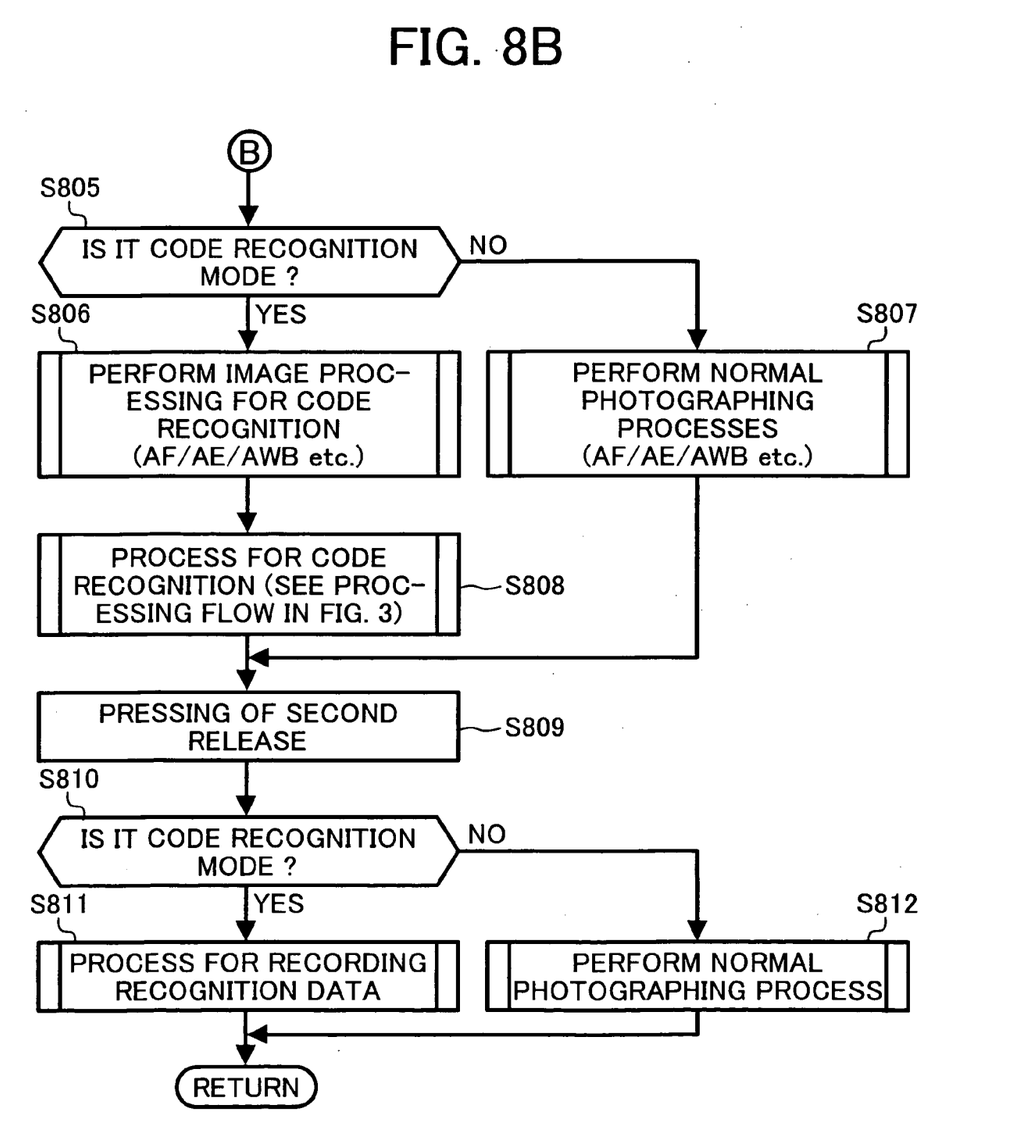

First of all, the recognition mode is started by the operation of the user (S801). Next, the setting of photographing is automatically changed over to a macro-mode so as to be able to carry out focusing to the object near to the digital camera easily (S802). Then, the guide is displayed with the calculation result in accordance with the setting of the kinds of codes (S803).

From then on, for a setting of mode, the first release (half pressing down) is carried out (S804), and the judgment in the code recognition mode is performed (S805). At this time, when the code recognition mode is not set (S805/NO), the normal photographing processes are performed in the first release (S807), and the second release is pressed down (S809). When the code recognition mode is set (S805/YES), the judgment in the recognition mode is performed, the image is scanned, the code recognition process is processed and the displaying of the result is displayed (S808) after most appropriate processes for the recognition of the printed code are performed (S806), and then the second release is pressed down (S809).

Further, after the second release (full pressing down) is carried out (S809), the judgment in the code recognition mode is performed (S810). At this time, if the code recognition mode is not set (S810/N0), the normal photographing process is processed (S812). When the code recognition mode is set (S810/YES), the data of the recognition is recorded to the F-ROM for data (S811).

As described above, the example for creating a most appropriate photographing circumstance is described in FIG. 8, by means of automatically setting to the macro-mode and changing to an exposure which is not influenced by gloss of a printed material. Therefore, according to the fourth embodiment of the present invention, it is possible to carry out the code recognition with reduced error in the recognition easily by automatically changing over the setting of photographing in the code recognition mode.

By the way, a file system within a memory of the digital camera is structured pursuant to DCF (Design rule for Camera File system).

The DCF is a standard of a file system in a digital still camera established by Japan Electric Industry Development Association (JEIDA) in January, 1999.

In addition, an information file defines a TEMPLATE folder, and is stored to that TEMPLATE folder with the same layer of a Digital Camera Images (DCIM) directory where a record file is stored therein to. The information file is stored in a format corresponding to number of items of information such as in a format classified by a name of file.

The corresponding file of the code and the information in the present invention is also kept to be stored, for example, in the TEMPLATE folder.

Figure 9A:
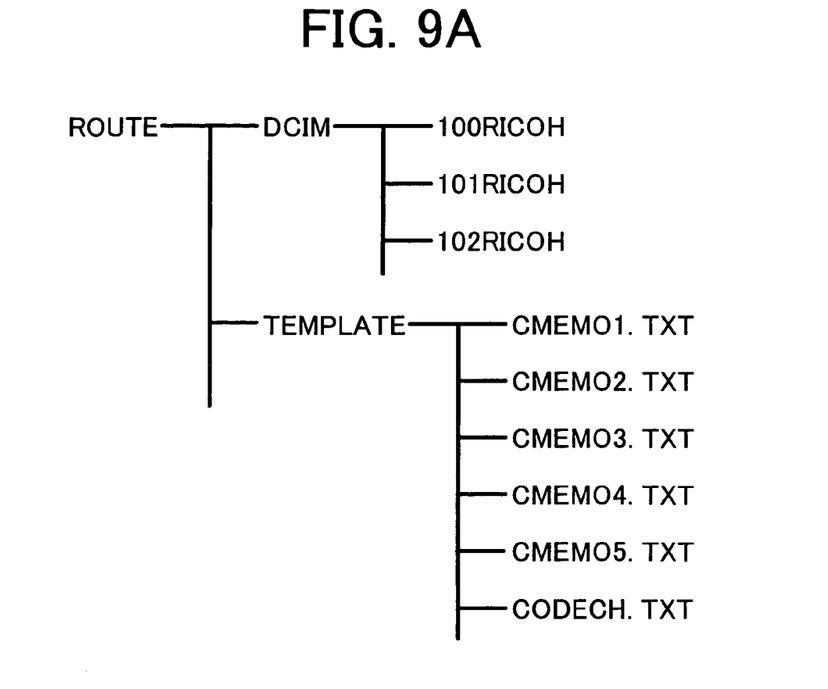
FIG. 9A is a diagram showing one example of a file system of an external memory or an internal memory.

Here, examples for the file system and the definition of the corresponding file will be described with reference to FIGS. 9A and 9B.

The information file is to be stored under a TEMPLATE directory as CMEMOx. TXT as shown in FIG. 9A. The corresponding file (CODECH. TEXT) of the code and the information of the present invention is also stored, for example, under the TEMPLATE directory. An example for the definition of the CODECH. TXT file is shown in FIG. 9B.

Figure 9B:
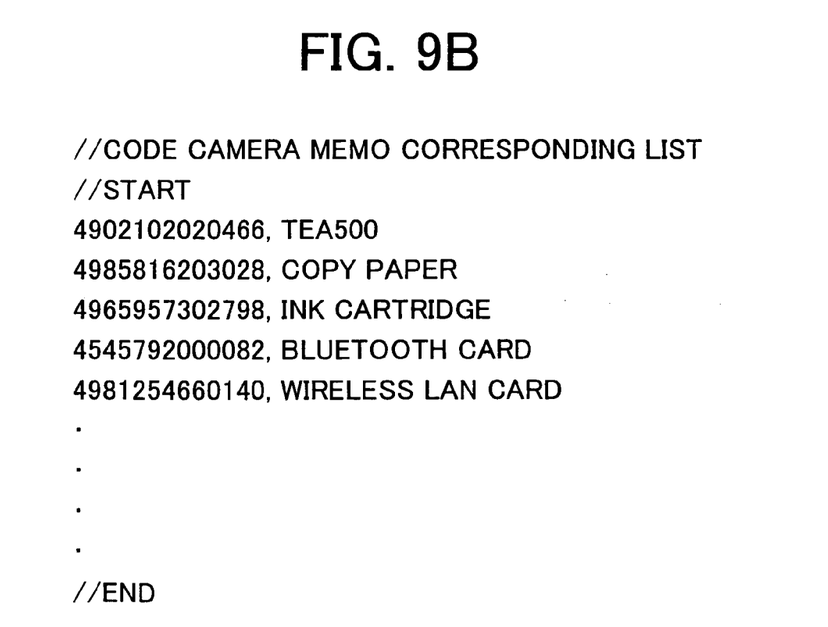
FIG. 9B is a diagram showing one example of the file system of the external memory or the internal memory.

Portions shown by two slashes in the drawing of FIG. 9B are ignored regarded as lines for comments.

Next, a fifth embodiment of the present invention will be described.

In the fifth embodiment, the searching for the corresponding file within the TEMPLATE folder is carried out at the time when the first release (half pressing down) is triggered and recognized the printed code, and outputting of the information corresponding to the code is carried out outputted as the result of the searching on the displaying device such as the LCD. When the code recognition is determined by the second release (full pressing down), the code and the information corresponds to the code are recorded to the F-ROM for data.

Now, an example of a series of processing flow in the fifth embodiment will explained with reference to FIG. 10.

Firstly, the recognition mode is started by the operation of the user (S1001). Subsequently, the guide is displayed with the result of the calculation in accordance with the setting of the kinds of codes (S1002).

Thereafter, the first release (half pressing down) is performed by being pressed to carry out the setting of mode (S1003), and the judgment in the code recognition mode is carried out (S1004). At this time, when the code recognition mode is not set (S1004/NO), the normal photographing processes are performed by the pressing down of the first release (S1006), and the second release is pressed down (S1008). When it is the code recognition mode (S1004/YES), the judgment in the code recognition mode is performed, the image is scanned, the process of the code recognition mode is processed and the displaying of the result is displayed (S1005). Then, if the corresponding file of the code and the information exists under the TEMPLATE directory, the searching for the corresponding file within the TEMPLATE folder is performed, and the result of that searching is displayed (S1007). Subsequently, the second release is pressed down (S1008).

In addition, after the second release (full pressing down) is performed (S1008), the judgment in the code recognition mode is carried out (S1009). At this time, if the code recognition mode is not set (S1009/NO), the normal photographing process (S1011) is performed. When it is the code recognition mode (S1009/YES), the data of the recognition is recorded to the F-ROM for data (S1010).

Figure 10:
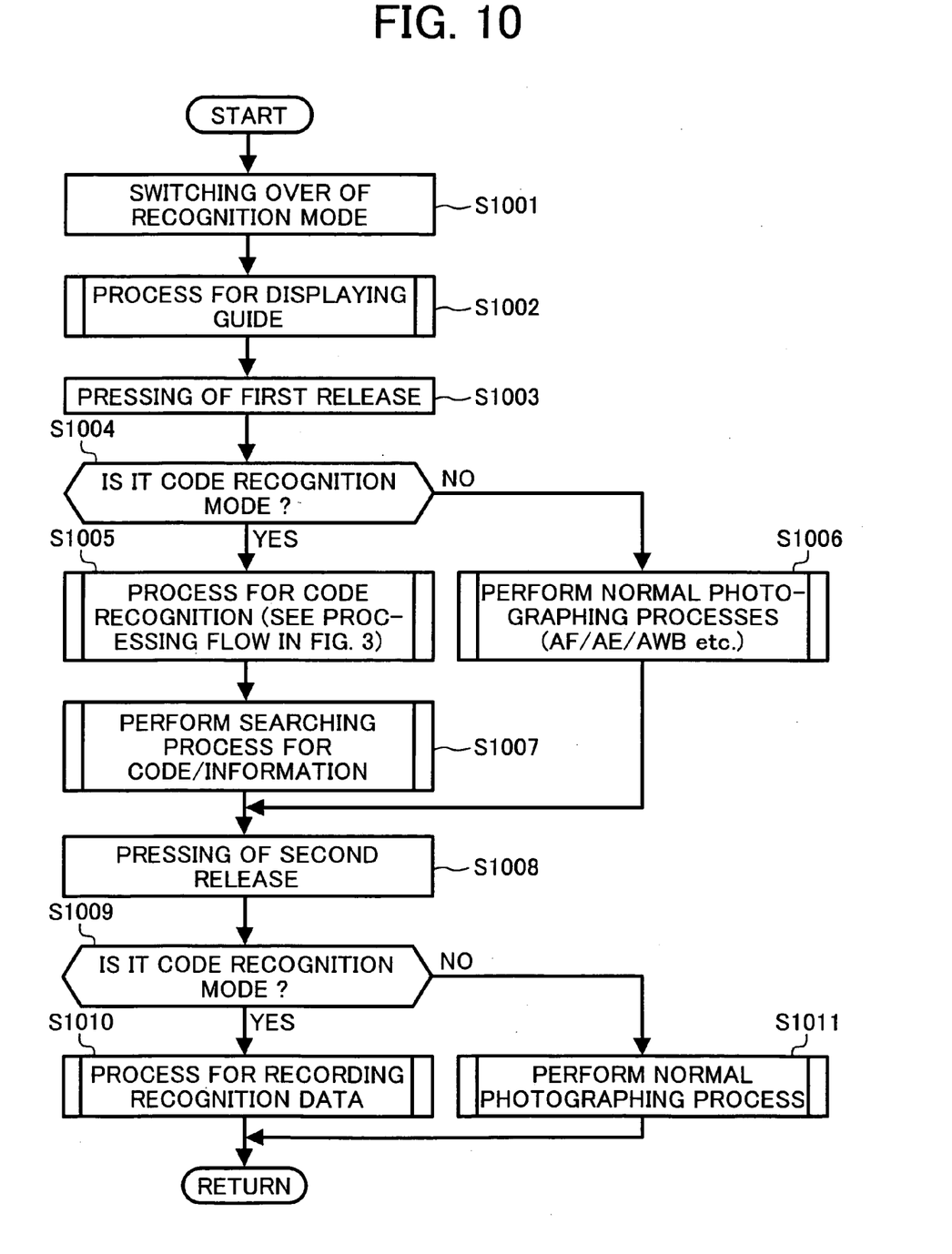
FIG. 10 is a flowchart showing a processing operation relating to a fifth embodiment of the present invention.

The code and the information recorded in such a way as in the example shown in FIG. 10 are later recorded to the Exif file of the photographed image as the additional information to the image. A recording file which becomes as a DCF object is stored into the DCF directory in the example shown in FIG. 9A, for instance, into "100RICOH". The recording file is created in accordance with an Exif format.

Meanwhile, the Exif is a format standard for image files in the digital still camera stipulated by the Japan Electric Industry Development Association (JEIDA) in October, 1995. In the recording file which is in the Exif format, areas for writing main images and thumbnail images are regulated.

Now, an example of which the recorded code and the information have been stored to the Exif as data for the additional information to the photographed image will be described with referring to FIGS. 11A and 11B.

Figure 11A:
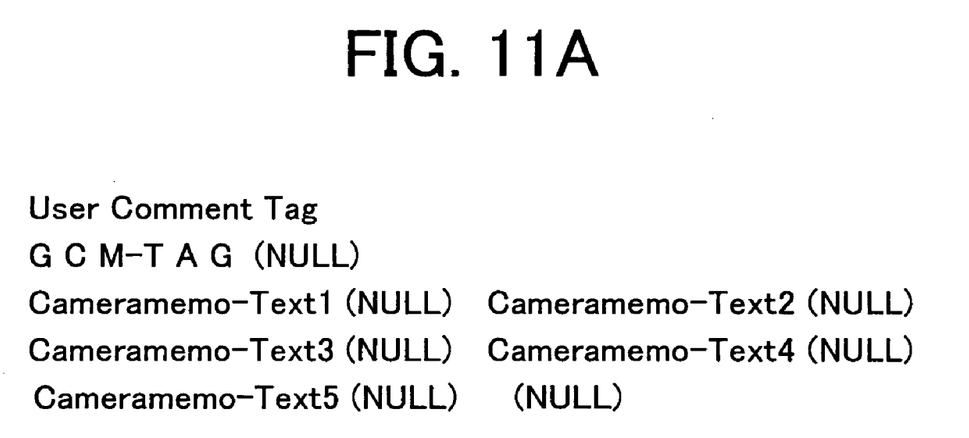
FIG. 11A is an explanatory diagram showing an example of information storing to an Exif file.
Figure 11B:
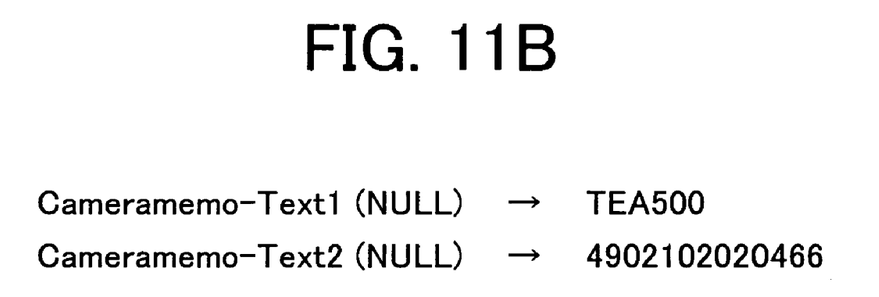
FIG. 11B is an explanatory diagram showing an example of the information storing to the Exif file.

As shown in FIG. 11A, the storing of the recorded code and the information to the Exif file is carried out with a format shown therein. Also, both of the code and the information can be stored into the Exif file as shown in FIG. 11B.

As described above, example of storing the recorded code and the information into "User Comment Tag" is described in the example shown in FIG. 11A. According to the fifth embodiment of the present invention, the additional information can be made easier to be understood, by converting the recognition code to information.

According to the present invention as described above, it is possible to automatically recognize the printed code such as the bar code easily by carrying out the similar operation similar to the normal photographing operation.

Also, it is possible to scan the data of the code by the simple operation of following the displaying on the display without causing the error in the recognition.

In addition, the error in the recognition can be avoided even more by displaying the most appropriate guide on the display in accordance with the printed code.

Moreover, the error in the recognition can also be avoided by the fact that the switching over to the most appropriate setting can be carried out easily, and since code setting means sets the start/stop codes and the kinds of bars as the content of the setting, the judgment of whether or not the recognition for the narrowest white and black bars of the bar code can be performed, as a result, the automatic recognition of the printed code can be achieved.

Also, because guide displaying means displays the minimum size which is a size necessary to be able to carry out the recognition to the user as the guide display, the user can enlarge the image to be photographed more than the minimum size, thereby the error in the recognition can be reduced.

In addition, since the guide displaying means decides a transverse width of the guide display from utilizing the minimum line width of the bar code, the minimum size for the recognition can be represented by the frame.

Furthermore, according to the present invention, it is possible to convert the printed code automatically to the easily understandable information which corresponds to the printed code.

Also, because a notification of the result of the recognition for the printed code can be performed by playback of voice, user-friendliness in the structure can be made, and since the printed code described in the present invention includes a bar code for identification in a commercial use, it is possible to recognize generally used bar codes.

What is claimed is:

1. A digital camera apparatus, comprising:
   an image inputting device configured to capture an image to be photographed, the image inputting device including a shutter release button having two positions for a first release and a second release;
   an image processing device configured to process said image captured by said image inputting device;
   a recognizing device configured to automatically recognize a printed code included in said processed image and output a result of the recognition of the printed code in response to the first release, and configured to determine the image captured by the image inputting device and record the determined image and the printed code recognized by the first release in response to the second release;
   a displaying device configured to display the result of the recognition of the printed code outputted from said recognizing device; and
   a recording device configured to record the determined image captured by the image inputting device and data of the recognition of the printed code automatically recognized by said recognizing devices.

2. The digital camera apparatus according to claim 1, wherein a result of the recognition of said printed code makes it possible to be notified by a playback of voice.

3. The digital camera apparatus according to claim 1, wherein the printed code includes a bar code for identification in commercial use.

4. A digital camera apparatus, comprising:
   a guide displaying device configured to display a guide for recognizing a printed code;
   an image inputting device configured to capture an image to be photographed;
   an image processing device configured to process said image captured by said image inputting device;
   a recognizing device configured to automatically recognize the printed code included in said processed image by matching the printed code with the guide;
   a displaying device configured to display a result of the recognition of the printed code automatically recognized by said recognizing device;
   a recording device configured to record data of the recognition of the printed code automatically recognized by said recognizing device; and
   a matching device configured to match the printed code with the guide.

5. The digital camera apparatus according to claim 4, wherein said guide displaying device is configured to present a minimum size necessary for carrying out the recognition to a user as the guide.

6. The digital camera apparatus according to claim 5, wherein a transverse width of the minimum size of said guide is determined from a minimum line width of a bar code.

7. A digital camera apparatus, comprising:
   an image inputting device configured to capture an image to be photographed;
   an image processing device configured to process said image captured by said image inputting device;
   a code setting device configured to set a kind of a printed code included in the image to be automatically recognized;
   a resolution setting device configured to set a resolution of said image captured by the image inputting device;
   a guide displaying device configured to display a guide for recognizing the printed code in accordance with a content on the kind of printed code to be automatically recognized set by said code setting device;
   a recognizing device configured to automatically recognize the printed code included in said image according to the guide corresponding to the content set by said code setting device and to the resolution of said image set by said resolution setting device;

a displaying device configured to display a result of the recognition of the printed code automatically recognized by said recognizing device; and a recording device configured to record data of the recognition of the printed code automatically recognized by said recognizing device.

8. The digital camera apparatus according to claim 7, wherein said code setting device is configured to set start/stop codes and a kind of bars as the content of the setting thereof.

9. A digital camera apparatus, comprising:

an image inputting device configured to capture an image to be photographed;

an image processing device configured to process said image captured by said image inputting device;

a code setting device configured to set a kind of said printed code to be automatically recognized;

a guide displaying device configured to display a guide for recognizing the printed code in accordance with a content on the kind of said printed code to be automatically recognized set by said code setting device;

a recognizing device configured to automatically recognize the printed code included in said image;

a displaying device configured to display a result of the recognition of the printed code automatically recognized by said recognizing device;

a recording device configured to record data of the recognition of the printed code automatically recognized by said recognizing device; and a changing device configured to change photographing modes automatically according to said guide displayed by said guide displaying device.

10. A digital camera apparatus, comprising:

an image inputting device configured to capture an image to be photographed;

an image processing device configured to process said image captured by said image inputting device;

a recognizing device configured to automatically recognize a printed code included in said image;

a displaying device configured to display a result of the recognition of the printed code automatically recognized by said recognizing device;

a recording device configured to record data of the recognition of the printed code automatically recognized by said recognizing device;

an information searching device configured to define an information file in which information corresponding to said printed code is included therein to at least one of an external recording medium attached to the digital camera apparatus and an internal memory beforehand, and configured to search said information corresponding to said printed code when said printed code is recognized; and an information adding device configured to convert said printed code to information corresponding to said printed code and add the information to the image.

11. A digital camera apparatus, comprising:

an image inputting device configured to capture an image, the image inputting device including a shutter release button having two positions for a first release and a second release;

an image processing device configured to process the image captured by the image inputting device, and configured to output the image;

a controller configured to automatically recognize a printed code included in the processed image and output a result of the recognition of the printed code in response to the first release, and configured to determine the image captured by the image inputting device and record the determined image and the printed code recognized by the first release in response to the second release;

a displaying device configured to display the image outputted from the image processing device, and configured to display the result of the recognition of the printed code outputted from the controller; and a recording device configured to record the determined image captured by the image inputting device and data of the recognition of the printed code automatically recognized by the controller.

12. The digital camera apparatus according to claim 11, wherein the controller is configured to previously define an information file in which information corresponding to the printed code is included therein to at least one of an external recording medium attached to the digital camera apparatus and an internal memory, configured to search the information corresponding to the printed code when the printed code is recognized, and configured to add the searched information to a file including therein the captured image and to record the file into the recording device.

13. The digital camera apparatus according to claim 11, wherein the controller is configured to output the result of the recognition of the printed code by a playback of voice.

14. The digital camera apparatus according to claim 11, wherein the printed code includes a bar code for identification in commercial use.

15. The digital camera apparatus according to claim 11, wherein the digital camera apparatus includes any one of a personal digital assistant, a personal computer, and a phone, each having a digital camera function.

16. The digital camera apparatus according to claim 11, wherein the controller is configured to display a guide for recognizing the printed code on the displaying device, and configured to automatically recognize the printed code matched with the guide displayed on the displaying device.

17. The digital camera apparatus according to claim 16, wherein the controller is configured to display a minimum size necessary for recognizing the printed code on the guide displaying device as the guide.

18. The digital camera apparatus according to claim 17, wherein a transverse width of the minimum size of said guide is determined from a minimum line width of a bar code.

19. The digital camera apparatus according to claim 16, further comprising:

an interface configured to set a kind of the printed code to be automatically recognized, wherein the controller is configured to display the guide according to the kind of the printed code set by the interface.

20. The digital camera apparatus according to claim 19, wherein the controller is configured to automatically recognize the printed code with a resolution determined according the kind of the printed code set by the interface.

21. The digital camera apparatus according to claim 19, wherein the interface is configured to set a resolution of the image to be captured by the image inputting device,
wherein the controller is configured to automatically recognize the printed code with the resolution set by the interface.

22. The digital camera apparatus according to claim 21, wherein the controller is configured to increase or decrease the resolution according to a result of the recognition of the printed code.

23. The digital camera apparatus according to claim 19, wherein the controller is configured to automatically change photographing modes according to the kind of the printed code set by the interface.

24. The digital camera apparatus according to claim 23, wherein the interface is configured to set start/stop codes and a kind of bars as a content of setting thereof.

* * * * *